United States Patent [19]

Turner

[11] 4,429,736

[45] Feb. 7, 1984

[54] CONCENTRATION IN TIME OF A GAS COMPONENT ENTRAINED IN A CARRIER GAS

[75] Inventor: Andrew J. Turner, Great Missenden, England

[73] Assignee: Perkin-Elmer Limited, Buckinghamshire, England

[21] Appl. No.: 305,297

[22] Filed: Sep. 24, 1981

[30] Foreign Application Priority Data

Oct. 10, 1980 [GB] United Kingdom ................. 8032745

[51] Int. Cl.³ ............................................. F28B 21/00
[52] U.S. Cl. ......................................... 165/61; 55/67; 55/197
[58] Field of Search ...................... 165/61; 55/67, 197, 55/386; 435/803

[56] References Cited

U.S. PATENT DOCUMENTS

| | | | |
|---|---|---|---|
| 3,486,298 | 12/1969 | Huebner | 55/67 |
| 3,735,565 | 5/1973 | Gilby et al. | 55/197 |
| 4,117,303 | 9/1978 | Hedberg | 219/130.1 |

FOREIGN PATENT DOCUMENTS

| | | | |
|---|---|---|---|
| 2459945 | 7/1975 | Fed. Rep. of Germany | 55/386 |
| 2431445 | 2/1976 | Fed. Rep. of Germany | 55/386 |

Primary Examiner—William R. Cline
Assistant Examiner—John M. Kramer
Attorney, Agent, or Firm—F. L. Masselle; E. T. Grimes; R. A. Hays

[57] ABSTRACT

The combination of an electrically conductive hollow body, a step-down transformer operable at a frequency greatly in excess of 1 kHz and solid phase temperature depressing means is used to realize the invention in its method and apparatus aspects. The temperature depressing means serve to bring the hollow body to a given depressed temperature so that when a gas component entrained in a gas carrier with which it forms mixture is passed through the hollow body for a period of, say, a few minutes the gas component condenses in the hollow body. The condensed component may later be freed and re-injected into the carrier by a process of thermal desorption which is achieved by direct ohmic heating of the hollow body via of the step-down transformer. The desorption time would typically extend over some ten seconds or so, as against the condensation time of several minutes, with the result that the gas component is concentrated in time, i.e. the number of molecules per unit time conveyed by the carrier emerging from the hollow body due to desorption is increased compared with the molecules per unit time conveyed by the carrier when entering the hollow body. The hollow body may be permanently thermally coupled to the temperature depressing means or selectively coupled by means of an actuator. The advantages within the context of the combination of using a transformer operating at a much higher frequency than that of the AC public supply are emphasized.

29 Claims, 7 Drawing Figures

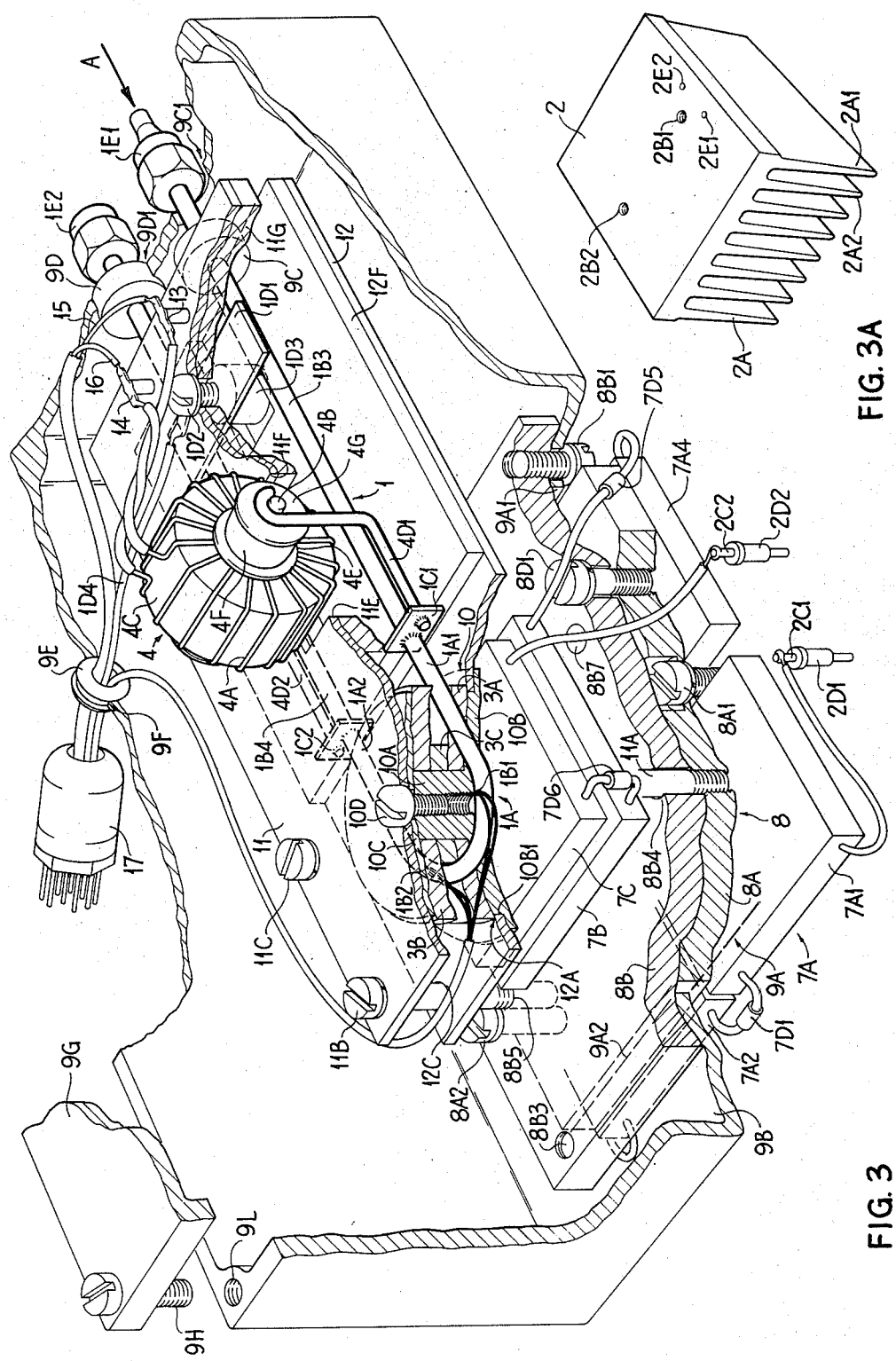

CONCENTRATION IN TIME OF A GAS COMPONENT ENTRAINED IN A CARRIER GAS

BACKGROUND OF THE INVENTION

This invention generally relates to the concentration in time of a gas component entrained in a carrier gas with which it forms a mixture and, in particular, to method of and apparatus for effecting such concentration by flowing the mixture through an electrically conductive hollow body of low thermal capacity which is cooled by a solid phase device during a condensation time interval and is heated during a desorption time interval by an AC current passing therethrough, the latter time interval being very short compared with the former.

Concentration in time as practised in the art varies in practical details, depending on the requirements of a specific application. In general, the mixture is passed through a cooled hollow body or "cold trap" containing a suitable adsorbent in order to condense the gas component molecules out of the carrier and onto the adsorbent for a suitably long time. Then the temperature is quickly raised and held for a short time; as a result, the molecules are thermally desorbed at a high rate and reentrained in the carrier gas. In this way the number of component gas molecules per unit time conveyed by the carrier emerging from the cold trap due to desorption is increased compared with the molecules per unit time conveyed by the carrier when entering the trap. If, for example, the application is the testing for impurities of gas chromatographic carrier gas, the trap may be used in a continuous mode, in which the gas is flowed at a steady rate straight from a supply cylinder through the trap and some suitable analytical instrument, such as a gas chromatograph, during both condensation and desorption times, after it has been established experimentally that the condensation time is significantly less than would be required for exceeding the condensation capacity of the trap. In other applications, the trap may be associated with gas switching circuits to interrupt gas flow between condensation and desorption or perform other flow control functions.

Although concentration in time often requires cooling the trap below ambient temperature, this is not always the case. If the gas mixture needs to be heated well above ambient temperature in order to keep a given gas component entrained in the carrier gas, condensation of the component will take place if the trap temperature is sufficiently depressed with respect to the temperature of the mixture. It is easy to appreciate, therefore, why a trap as hereinbefore referred to is usually called a cold trap, i.e. cold with respect to the temperature of the gas admitted for condensation, even though it may in fact be held at above ambient temperature.

It is believed that the phrase "concentration in time" aptly suggests trapping molecules of interest over a comparatively long time interval, say, five minutes, and releasing them in a few seconds. In other words, the molecules that could be counted in the mixture flowing in during the five minutes of the condensation stage could also be counted in the mixture flowing out during the few seconds of the thermal desorption stage. It could, of course, be argued that the phrase "concentration in volume" is equally applicable, in that the molecules that are found in the comparatively large volume of mixture that flows in during condensation are also found in the much smaller volume that flows out during desorption, the disparity in volume being of course the result of the disparity in duration between the two stages. If we assume that the flow of the mixture is not only continuous but also constant, any Gas Chromatograph supplied via the trap will naturally receive a plug of mixture in which the molecules of interest are in higher volumetric concentration than would be the case for the same flow if the trap were not interposed.

Any hollow body of low thermal mass and convenient geometry, i.e. a longitudinally extending hollow body, may be used as a cold trap in the concentration method and apparatus referred to, provided it can withstand the desorption temperature and is substantially inert to the mixture that is to flow therethrough. In order to enhance its efficiency, the hollow body may be packed in part with a material that is a good adsorbent for the gas component to be condensed but not for the carrier. A known trap comprises a hollow body in the form of a thin-walled stainless steel U-tube packed with an adsorbent such as Tenax (R.T.M.) in the bend region, the limb space being left free. One end of the tube represents the inlet for the unconcentrated mixture and the other the outlet for the concentrated mixture. Both ends are provided with connecting means for inserting the trap in a suitable gas circuit so that, for example, a sample gas component in a carrier may be routed to some analytical instrument, such as a gas chromatograph, after the component has been concentrated in time, with the result that a chromatogram benefiting from better signal-to-noise ratio may be obtained.

In a known prior art arrangement making use of a U-tube as referred to, the tube may be cooled to a low temperature either by immersing it in a Dewar containing liquid nitrogen or by offering the Dewar to the tube. The gas condensation stage is extended over a period of minutes, at the end of which the tube is heated up for something less than half a minute, to effect thermal desorption of the condensed gas and thus complete the concentration process. In this case, no dwell is interposed between condensation and desorption.

It is clearly important to make the transition from the temperature of the condensation stage to the much higher temperature of the desorption stage as rapidly as the nature of the condensed gas permits since the effectiveness of the concentration process depends on it. In the prior art referred to, desorption is effected by ohmic heating of the bend region, which to this end is permanently connected through heavy leads to the secondary of a large step-down transformer, the primary being fed from the public AC supply for the duration of the desorption stage.

There are several disadvantages connected with the prior art method and apparatus. Firstly, the use of liquid nitrogen for cooling is unacceptable for routine applications in an industrial environment: the Dewar needs to be replenished from time to time and the concentration apparatus, which could well form part of a pollution analysing system, cannot therefore be left unattended overnight unless expensive automated means for topping up the Dewar are employed. Secondly, the displacement of the Dewar, or worse still the U-tube, is an inconvenient mechanical operation giving an ill-defined transition between cooling and heating. Thirdly, the use of ohmic heating at the frequency of the public supply means in effect that the secondary of the bulky step-down transformer thus required cannot be brought close enough to the U-tube to allow the use of very short leads. The comparatively long leads in turn compel the use of a very heavy gauge in order to avoid excessive voltage drop. Such massive leads, in a good heat conductor such as copper, impose a considerable thermal loading on the bend region of the U-tube and cause undesirable heat gradients at the points of attachment to the tube, leading to recondensation of the desorbed gas and, therefore, lowering of the concentration efficiency. The high thermal loading is also objectionable because it is wasteful of cooling effort, i.e. cooling of the bend region takes longer or for a given cooling time the temperature cannot be depressed quite as far as would be the case if the loading were considerably lower. Furthermore, the bulk involved in both the heating and cooling arrangements of the prior art referred to is a serious drawback which makes it impracticable to incorporate them in compact apparatus such as analytical instruments.

SUMMARY OF THE INVENTION

The object of the present invention is to provide method of and apparatus for concentrating in time a gas component entrained in a carrier gas with which it forms a mixture, which method and apparatus avoid at least some of the disadvantages of the prior art hereinbefore indicated.

In essence the said object is achieved by a novel combination of solid phase cooling and direct ohmic heating by an AC current having a frequency measured in thousands rather than tens of Hertz. The invention enables unsuspected method and apparatus advantages to be realized by the specified cooling and heating processes.

In accordance with a broad aspect of the invention, an electrically conductive hollow body of low thermal capacity (e.g. a thin-walled tube) is used to stream the mixture therethrough. The hollow body is first cooled by a solid phase temperature depressing means for a given condensation time, e.g. several minutes, during which the gas component condenses within the hollow body. Then the hollow body is heated at a high rate and is maintained at an elevated temperature for a thermal desorption time much shorter than the condensation time, e.g. under one minute, by passing an AC current therethrough having a frequency of at least 1 kilohertz, via a step-down transformer.

In accordance with one aspect of the invention, a passive temperature depressing means is thermally coupled to the hollow body through a permanent solid phase thermal coupling means having a thermal resistance value adjusted to provide an acceptable and feasible compromise between the near zero and near infinite resistance limits that would unacceptably favour temperature depressing and temperature elevating, respectively.

To enable condensation temperatures below ambient to be reached, there may be added active temperature depressing means in the form of a thermoelectric pump between the hollow body and the passive temperature depressing means.

A static thermal coupling represents a significant practical convenience at the cost of a slight lowering of efficiency in both the temperature depressing and elevating stages; in the former, because the thermal resistance of the coupling involves a temperature drop thereacross which decreases the effectiveness of cooling, and in the latter, because the heating current must overcome the loading effect of the thermal capacity of the temperature depressing means. Since in practice it is much easier to heat up a body than to cool it, the compromise may be swung with advantage in favour of temperature depressing by selecting as tight a thermal coupling as possible without having to make use of a disproportionate amount of heating power through the step-down transformer.

In accordance with another aspect of the invention, a tight thermal coupling between the hollow body and the solid phase temperature depressing means is maintained during the condensation stage and broken by the insertion of a small air gap during the desorption stage. Such an arrangement involves a mechanical displacement, e.g. of a portion of the hollow body, but it has the great advantage of permitting maximum efficiency to be achieved in both temperature depressing and elevating, in that it enables the temperature depressing means to be tightly coupled to the hollow body before the condensation stage is initiated and, of course, the hollow body to be freed from the thermal loading represented by the temperature depressing means before the desorption stage. The arrangement would naturally be the preferred choice where the temperature depressing requirements were particularly stringent.

In accordance with yet another aspect of the invention, the step-down transformer is designed for a comparatively high frequency, in the region of between, say, 10 to 20 kHz which enables the effective thermal capacity, weight and size of the transformer to be drastically reduced by comparison with a transformer of the same power output designed for 50–60 Hz. As a result, the ratio of the effective thermal capacity of the transformer to that of the hollow body can easily be kept to a value not greater than 5:1 and the weight ratio to 50:1, both of these ratios being well outside the scope of prior art arrangements using 50–60 Hz transformers. The term "effective" here refers to the thermal capacity actually "seen" by the hollow body.

In fact, the effective thermal capacity can be so reduced, such as by providing a single turn secondary that is thermally insulated from the rest of the transformer, as to become comparable with that of the hollow body itself. This contrasts very dramatically with the prior art where ratios of 1000:1 are not uncommon.

In accordance with yet another aspect of the invention, electrically resistive links may be provided between the terminal of the transformer secondary and the points of connection to the hollow body. The localised heating thus provided further reduces one of the adverse effects brought about by the thermal loading imposed by the transformer, in that it tends to prevent the formation of cold spots within the hollow body near the said points of connection. In the prior art no attempt appears to have been made to deal with the cold spot problem, although the use of massive transformers makes the problem far more acute.

In accordance with yet another aspect of the invention, only a median segment of the hollow body is depressed to the condensation temperature and raised to the full desorption temperature, a flanking segment on each side of the median working segment being arranged to act as a thermal buffer. The arrangement is such than an ideal situation may be approximated whereby the temperature from one to other limit of the median segment is uniform while that from each limit to the corresponding end of the hollow body changes linearly, in a downward or upward direction depending on whether condensation or desorption is taking place.

The importance of flanking the median segment, which may be called the working segment of the hollow body, with buffer segments does not appear to have been recognized by the prior art, with the result that hitherto temperature depressing and elevating in a concentration in time process as defined earlier has been very much influenced by the thermal situation obtaining at the ends of the hollow body where insertion into some form of utilization gas circuit must be made.

Other features and advantages of the present invention will become apparent upon examination of the ensuing description in conjunction with the accompanying drawings, wherein:

BRIEF DESCRIPTION OF THE DRAWINGS

FIGS. 3 and 3A detail a practical embodiment of the general concept outlined in FIG. 2;

DETAILED DESCRIPTION OF THE INVENTION

Figure 1:
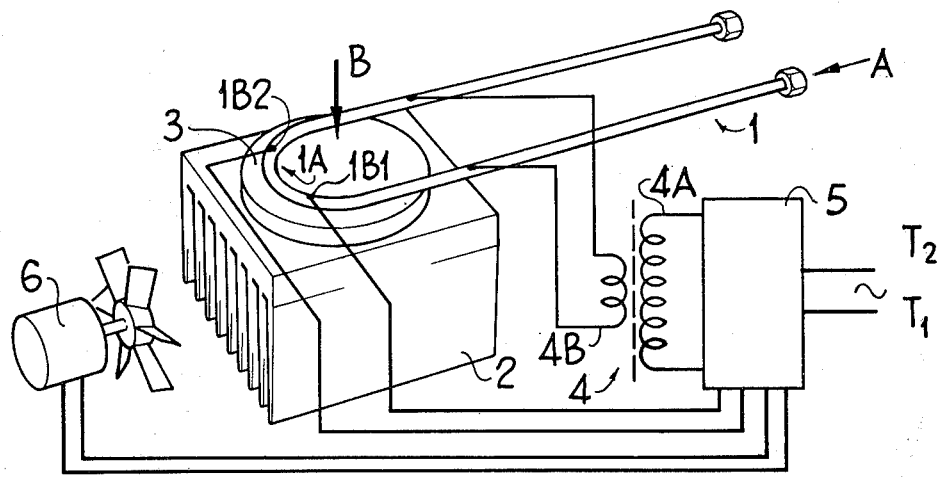
FIG. 1 illustrates in outline the general concept of performing concentration in time with the aid of a passive temperature depressing means in the form of a heat sink.

In FIG. 1, a stainless steel U-tube 1, provided with a thin wall to minimize its thermal mass, represents the hollow body through which the gas mixture may be streamed in the direction of arrow A. A particulate adsorbent, e.g. Tenax (R.T.M.), is packed within the bend portion 1A kept in permanent thermal coupling with a finned aluminium block 2 through a foam silicone rubber pad 3, the block acting as passive temperature depressing means and the pad as solid phase thermal coupling means of predetermined thermal resistance. The actual value of the thermal resistance may be adjusted by means (not shown) for applying a force in the direction of arrow B for causing bend portion 1A (hereinafter called bend 1A) to compress pad 3 by the required amount, bearing in mind that, as would be expected, the thermal resistance of the material decreases with the force in the area of compression.

The bend 1A may be directly heated by AC current supplied through a step-down transformer 4 having a primary 4A intended to be fed from an AC supply (not shown) within a general power controller 5 having 60 (or 50 Hz) AC input terminals $T_1$ and $T_2$, the secondary 4B being permanently connected to the U-tube 1, one terminal to a one limb and one to the other, as shown. (See later for more specific details.)

The block 2 tends to drag the bend 1A down to a depressed temperature, which may be ambient temperature, when the controller 5 switches off ohmic heating power to the bend 1A, via transformer 4, at the end of the thermal desorption stage. Optionally, this action may be aided by a fan 6 which forces a stream of air through the fins, end to end.

The thermal resistance of pad 3 is so adjusted as to enable block 2 to depress the bend 1A to the depressed temperature in the permissible time after the controller 5 has switched off at a predetermined elevated temperature. At the heating stage the controller 5 responds to the temperature of bend 1A sensed by thermocouples 1B1 and 1B2 to feed through in servo loop fashion the power required to override the action of the block 2 as attenuated by pad 3 and raise the bend portion 1A to the desired elevated temperature at the required rate.

Pad 3 represents a deformable thermal coupling material which allows the resistance value that offers the best compromise in a particular design to be expediently approached. Different materials may of course be used to cover different ranges of thermal resistance. Values in the range 5 to 50 degrees C. per watt are suitable, the lower values favouring cooling and the higher tending to lighten the heating load.

In order to appreciate the function of pad 3, we may begin by considering what would be the situation if no significant thermal impedance existed between the bend 1A and the block 2 and a fast rate of heating followed by an equal rate of cooling were required. The stated requirement could obviously be met by supplying comparatively high heating power and using a large heat sink, i.e. a block 2 of large dimensions with massive air flow through its fins. However, because of the assumed close thermal coupling, the more effective the heat sink the greater the heating power that would be required.

A clear analogy is the charging of a capacitor to a given voltage while it is shunted by a low value resistor. The low resistor will ensure a short time constant of discharge, but in order to achieve an equally short time constant of charge, energy must be supplied at a comparatively high rate to the parallel combination of resistor and capacitor, i.e. high power must be supplied. For a capacitor of a given value (representing the analogue of a U-tube of a given effective thermal mass) a practical limit is soon reached if the time constant is made shorter and shorter. On the other hand, if the time constant of discharge can be made much longer than the time constant of charge—which means shunting the capacitor with a higher resistance—less power will be required to charge up to the given voltage. In practices, one could select the value of shunting resistor that gave the correct time constant of discharge and then supply energy at the correct rate to achieve the desired voltage level in the desired time interval, i.e. to achieve the shorter time constant of charge. In other words, selecting the value of the shunting resistor enables the increase in the time constant of discharge to be traded off for lower input power to the capacitor. The present embodiment of the invention recognizes that in an apparatus for concentrating in time a gas component entrained in a gas carrier with which it forms a mixture an analoguous trade off may be used to achieve an arrangement wherein a permanent thermal coupling is maintained between the temperature depressing means and the hollow body throughout the concentration process.

Practical consideration will impose a lower limit on the wall thickness of tube 1 and, therefore, the effective thermal mass that must be brought to the depressed temperature after heating is interrupted. Having chosen a convenient thickness and, therefore, determined the thermal mass, one can adjust the compression of pad 3 so as to establish the correct thermal impedance between the bend 1A and the block 2 that will enable the latter to bring the bend 1A from the elevated temperature to the depressed temperature in the maximum time that can be allowed. Once the adjustment has been made, the heating power to be supplied is simply that which is required to raise the bend 1A to the elevated temperature at the required rate. The set thermal resistance provided by the pad 3 clearly permits both the elevated temperature to be reached at the predetermined rate and the depressed temperature to be restored within the permissible maximum time interval.

The unaided heat sink represented by block 2 naturally provides a very simple and, therefore, very reliable temperature depressing means that is quite adequate for many applications where condensation temperatures below ambient are not required. The addition of a thermoelectric pump allows moderate low temperatures to be achieved, i.e. down to around 50° C. below ambient, in a convenient manner compared with the prior art arrangement hereinbefore referred to. The thermo-electric pump is a static device based on the Peltier effect that can be left unattended for indefinite periods and need only be supplied with a reasonably smooth DC current that may typically range from 5 to 9 amperes, although units taking up to 30 amperes are commercially available. In the present state of the art, heat loads of up to 200 watts may be handled. However, the greater the heat load the smaller the temperature differential that can be maintained between the cold and the hot surfaces of a given device. Because the hollow body is of low thermal capacity and the method of concentration in time seldom requires the low temperatures associated, for example, with liquid nitrogen, the thermo-electric pump offers considerable latitude in design. A permanently coupled pump will naturally be overriden during the desorption stage and the temperature of its cold face will rise. It has been found that the pump can tolerate the rise quite well since the desorption time is quite brief.

Figure 2:
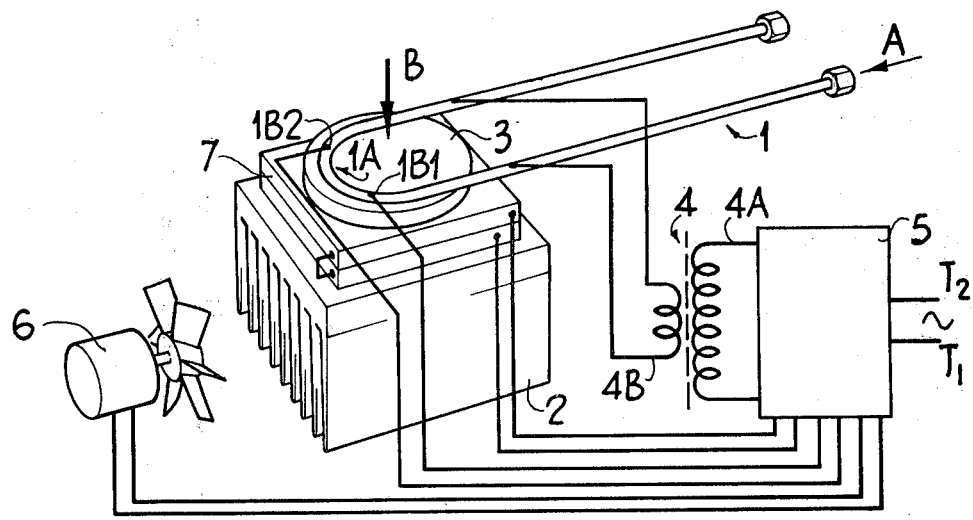
FIG. 2 is a modification of FIG. 1 in which the heat sink is assisted by an active temperature depressing device in the form of a thermoelectric pump.

In FIG. 2, the action of block 2 is supplemented by that of a thermoelectric pump represented by Peltier stages 7 interposed between block 2 and bend 1A. Again, the fan 6 is optional but it would normally be included to enable the Peltier stages to function at higher efficiency than would otherwise be the case. The engineered embodiment of FIG. 3 does in fact include 3 such stages. The engineered parts corresponding to the diagrammatically represented parts in FIG. 2 bear like references in FIGS. 3 and 3A, the latter figure being included in order that the block 2, provided with cooling fins 2A, may be represented in a smaller scale for better utilization of the permitted drawing area, although block 2 must naturally be assumed to be attached to the structure represented in FIG. 3, tapped holes 2B1 and 2B2 being engaged by screws to which reference will presently be made.

In FIG. 3, three Peltier cooling stages are distinguished, referenced 7A, 7B and 7C. These are stacked in a generally pyramidal relationship with the base of the pyramid represented by stage 7A, comprising 4 coplanar generally square elements 7A1 to 7A4 (7A3 not shown). Between stages 7A and 7B a two-part spreader plate 8 is disposed, comprising a lower plate part 8A and an upper plate 8B, the former fastened to the block 2 by two screws 8A1 and 8A2 (the latter not shown) that after passing between the left-hand pair of square elements 7A1 to 7A4 and the right-hand pair engage tapped holes 2B1 and 2B2 in block 2 (FIG. 3A), and the latter, of larger area, attached to box 9 by two diagonally opposed screws 8B1 and 8B2 (8B2 not shown) threaded in spreader plate part 8B. Screw 8B1 is shown at one end of the diagonal; at the opposite end, the tapped hole 8B3 for receiving its counterpart 8B2 is shown. Parts 8A and 8B are fastened together in good thermal contact by screws 8D1 and 8D2 (the latter not shown).

The Peltier stages must naturally be supplied with DC current. In FIG. 3 the stages form part of an electrical series circuit established between terminal 2C1 supported through insulating bush 2D1 in a hole 2E1 in block 2 (FIG. 3A) and terminal 2C2 similarly co-operating with bush 2D2, and hole 2E2. The four elements of stage 7A are joined in series with one another and with the remaining stages. One of the three interelement connections required is shown at 7D1 (7D2 and 7D3 are not shown) and the interstage connections are shown at 7D5 and 7D6, respectively. The lower ends of terminals 2C1 and 2C2 protrude into the air space between fins 2A1 and 2A2 and leads (not shown) are connected to them which are taken to the controller 5 (FIG. 2) through which the Peltier stages of the thermo-electrical pump are energized continuously during the concentration in time process.

The underside of the box 9 is provided with a generally square window 9A, a rear edge portion of which is just visible at 9A1 and an opposite front edge portion indicated by the dotted lines 9A2. Part 8A emerges downward of window 9A and the overlying part 8B abuts against the floor 9B of box 9.

Stage 7A, spreader plate parts 8A and 8B, stage 7B and stage 7C form a stack. On top of the stack is a bobbin-like aluminium structure 10, having a hub 10A integrally extending into a lower cheek 10B bearing against the upper face of stage 7C. An upper cheek 10C, constructed as a separate aluminium disc with a hole in the centre through which a fastening screw 10D is threaded into the hub 10A, completes the structure. The hub 10A, the centre of which is located approximately at the centre of curvature of the bend 1A, locates three annular flat pads of foam silicone rubber, two of which referenced 3A and 3B, respectively, have a radius much greater than the inner radius of curvature of bend 1A, and the remaining one 3C a slightly greater radius. Pads 3A to 3C together may be regarded as the counterpart of the pad 3 shown in FIG. 2.

When the upper cheek 10C of bobbin 10 is fastened onto the hub 10A, pads 3A and 3B are resiliently urged against diametrically opposed upper and lower surface portions of bend 1A by an amount that for a U-tube 1 of a given outer diameter is predetermined by the height of hub 10A from the inner face of cheek 10B and by the density and initial thickness of the two pads. Pads 3A and 3B, and to a lesser extent 3C, provide a thermal resistance, pre-set on manufacture, between bend 1A and block 2 via bobbin 10, stages 7C and 7B, and spreader plate parts 8B and 8A.

The bobbin 10 is urged axially onto the upper face of stage 7C by a rectangular fiberglass plate 11 clamped by screws 11A, 11B and 11C (a fourth screw 11D is not shown) passing through holes 8B4, 8B5, 8B6 and 8B7 (the hole 8B6 for screw 11C is not shown) in spreader plate part 8B and threaded in spreader plate part 8A. This means that the whole stack now including bobbin 10 is held together under compression. To improve thermal contact between the contacting surfaces a silicone grease may be used which has been loaded with thermo-conducting particles.

Under fiberglass plate 11, and spaced from it nearly the entire height of the bobbin 10, is a similar fiberglass plate 12 with a hole cut in it at 12A for locating in a groove 10B1 of cheek 10B, with a small circumferential annular portion of pad 3A overlying the upper face of plate 12. In addition, plate 12 is provided with a hole 12C for screw 11B to pass through and three other holes (not shown) for accommodating screws 11A, 11C and 11D (the latter not shown). Towards its rear end, plate 12 is fastened in a manner to be presently described.

As generically indicated in FIG. 2, a transformer 4 is used for ohmic heating of bend 1A, within which the adsorbent is located. In FIG. 3, the transformer 4 comprises a primary winding 4A having 20 turns of 20-gauge copper wire wound on a toroidal core 4C of ferrite material, the ends of the winding being taken to stand-off terminals 13 and 14 and soldered thereto. Two leads 15 and 16 connect the terminals with two separate pins of the plug 17. The secondary winding is merely a round silver bar 4B, which by means of L-shaped conductors 4D1 and 4D2 (also of silver), brazed to rectangular stainless steel tabs 1C1 and 1C2, respectively, in turn brazed to respective limbs of the U-tube 1, supplies heating AC current to the bend 1A.

Transformer 4 is intended to be supplied with AC power at the comparatively high frequency of 20 kHz through a controller 5 (FIG. 2). This explains, of course, the small number of turns of the primary winding 4A and the small size of the transformer 4 as a whole, the lower part of which actually extends below the fibreglass plate 11 through a window therein having forward and rear edge portions showing at 11E and 11F, respectively. The controller 5 responds to the temperature of the bend 1A sensed by thermocouples 1B1 and 1B2, brazed directly onto the bend 1A, and ensures by temperature servo action that the desired temperature of desorption is attained. A pair of leads from each thermocouple are taken to plug 17, through which a connection is made with controller 5. Should the action fail for any reason, a catastrophic thermal runaway is prevented by a fail safe provision incorporated in the transformer 4. The provision involves the co-operation of L-conductors 4D1 and 4D2, but the description will be confined to the former since the arrangement involving the latter is in fact symmetrical. The AC power fed to the transformer 4 is derived from an oscillator-cum-power amplifier arrangement, located within the controller 5, which is itself powered by stepping down and rectifying the 60 Hz or 50 Hz public supply extended to terminals $T_1$ and $T_2$ (see FIG. 2). Such arrangement is well known in the prior art and need not be illustrated or described in detail.

The silver bar 4B forming the secondary of transformer 4 is joined to the hook-ended upright limb of the L-conductor 4D1 by soft solder. In manufacture, before the soldered joint is made, a rear washer 4E of polytetrafluoroethylene, i.e. PTFE, is slipped over the bar 4B until it abuts against the primary winding 4A, followed by a thick silicone rubber sleeve 4F and finally a front PTFE washer 4G. The length of the sleeve 4F is such that the sleeve needs to be compressed axially so that it barrels out before the end hook of the L-conductor 4D1 may be engaged with the silver bar 4B and soldered thereto. Should the bend 1A overheat, e.g. through failure of controller 5, the excess heat flowing along the L-conductor 4D1 will melt the solder, thus causing the barreling out of the sleeve 4F to relax and produce an axial force enabling the L-conductor 4D1 and the silver bar 4B to part company and interrupt the heating current. In other words, the soldered joint acts as a fusible link.

Although it would naturally be possible to incorporate electrical or electronic fail safe circuitry in the controller 5, it has been found that such circuitry is not itself immune from failure. The fusible link acts in a way that is essentially mechanical and must inevitably prevent a catastrophic failure resulting in the effective destruction of the entire device. However, the link is not intended to prevent non-destructive overheating of the tube 1, such as would result in the disintegration of the adsorbent within the bend 1A, but without serious damage to the tube itself. If desired, therefore, the fusible link may be used as a back up to known temperature monitoring circuits which would either give warning of an excessive temperature rise or/and automatically shut down the device. Such circuits can operate within narrower temperature limits compared with fusible links and this, of course, is particularly important where the desorption temperature to which the adsorbent is raised is not far removed from the disintegration temperature.

The silver bar 4B is provided with a thermally insulating sleeve (not shown) to prevent it from being loaded by the thermal mass of the core 4C.

From FIG. 3 it can be seen that the bend 1A is clearly the portion between the tabs 1C1 and 1C2 that includes the bend 1A and two comparatively short lengths of the tube 1, which are referenced 1A1 and 1A2. For the purposes of the present description of FIG. 3 reference to the bend 1A is actually intended to include rectilinear portions 1A1 and 1A2, which are also raised to the desorption temperature. In fact, the same consideration applies to all the U-tubes shown in the drawings. Bend 1A represents the median working segment of the hollow body as referred to under the sub-heading Summary of the Invention.

Rearward of tabs 1C1 and 1C2, at a location representing approximately three quarters of their length, the straight limbs of the U-tube 1 are bridged by a stainless steel plate 1D1. Plate 1D1 thus completes an electrical circuit that is supplied in parallel with the bend 1A circuit by the transformer 4. The limb segments 1B3 and 1B4 between the plate 1D1 and the tabs 1C1 and 1C2, respectively, are such that their combined series electrical impedance plus that of the plate 1D1 is approximately twice that of the bend 1A. This means that although the segments 1B3 and 1B4 become heated in operation they get much less hot than the bend 1A. The object of heating the limb segments is to prevent re-condensation of sample in the limb of U-tube 1 through which the carrier and sample mixture exits in the desorption operation. The requirement to be met is not very stringent, as long as the exit limb, which for the direction of flow indicated by arrow A is 1B4, does not fall below a minimum temperature. The positioning of plate 1D is therefore a design choice.

It can now be recognized that the bend 1A and the pair of limbs 1B3 and 1B4 represent, respectively, the median working segment and the buffer segments of the hollow body as outlined under the sub-heading Summary of the Invention.

The plate 1D1 is used as convenient earthing point for the entire structure within box 9 that is electrically integral with tube 1. A lead 1D4 extends from plate 1D1 to the plug 17 which fits into a socket (not shown) in general controller 5 (FIG. 2). All the leads to plug 17 pass through a grommet 9E in a hole 9F in the rear elevation of box 9.

Another anti-condensation measure is represented by the tabs 1C1 and 1C2. It would naturally be possible to braze the L-shaped conductors 4D1 and 4D2 directly onto the tube 1. Unfortunately, that would tend to cause cold spots at the points of attachment as a result of the inevitable localized thermal loading produced. The interposed stainless steel tabs 1C1 and 1C2 prevent that because their thickness is so chosen that sufficient local ohmic heating is generated to prevent re-condensation of the desorbed sample.

Rearward of plate 1D, the two limbs of the tube 1 pass through thick silicone rubber grommets 9C and 9D accommodated in holes 9C1 and 9D1 (grommet 9C is shown just forward of hole 9C1) and are provided with end connectors 1E1 and 1E2 a short distance after emerging from the box 9 for the purpose of enabling gas-tight connections to be made to feed and utilization circuits (not shown), respectively. The diameter of holes 9C1 and 9D1 is slightly greater than the maximum outer diameter of the connectors 1E1 and 1E2, so that having released block 2 from the assembly within the box 9 and forced out the grommets 9C and 9D, the assembly may be slid out of box 9 as a complete unit for maintenance and other purposes.

It should be observed that since the limbs 1B3 and 1B4 introduce a considerable thermal impedance between the bend 1A and the connectors 1E1 and 1E2 the said limbs act as thermal buffers, which in practice have been found to have an important effect in attenuating the temperature gradients that would otherwise be set up in the bend 1A.

From a position extending from just behind tabs 1C1 and 1C2 to its rear edge, the underside of fibreglass plate 11 is lined with a slab of foam silicone rubber 11G which faces, and is coextensive with, an identical slab 12F attached to the upper surface of the fibreglass plate 12, with the tube 1 sandwiched between the two slabs under light predetermined compression provided by a screw 1D2 which goes through the fibreglass plate 11, the underlying slab 11G, a cylindrical spacer 1D3, the slab 12F, the fibreglass plate 12 and finally co-operates on the underside of plate 12 with a retraining nut (not shown). Foam silicone rubber slabs 11G and 12F serve essentially to stabilize the thermal environment of the U-tube limbs particularly against convection currents within the box 9.

A lid indicated at 9G fits over the open end of box 9 and is held in position by 4 screws such as 9H fitting into tapped holes such as 9L at the four corners of the box 9. A non-hardening sealing compound may be used between the lid 9G and the box 9 and elsewhere as required to ensure that the structure within the box 9 is hermetically enclosed. If this is done, a safety blow-off valve should be included as a precaution against bursting following a pressure build up in the course of high-pressure testing a leaky U-tube. Another desirable precaution would be to prevent condensation of atmospheric moisture within the box by enclosing suitable hygroscopic material, e.g. silica gel. A further alternative, in fact the preferred choice, is to make provision for purging the interior of the box by continuously flowing nitrogen therethrough between minute inlet and outlet ports, which would effectively preserve hermetic sealing, avoid condensation effects and prevent the risk of a burst.

Figures 4, 4A:
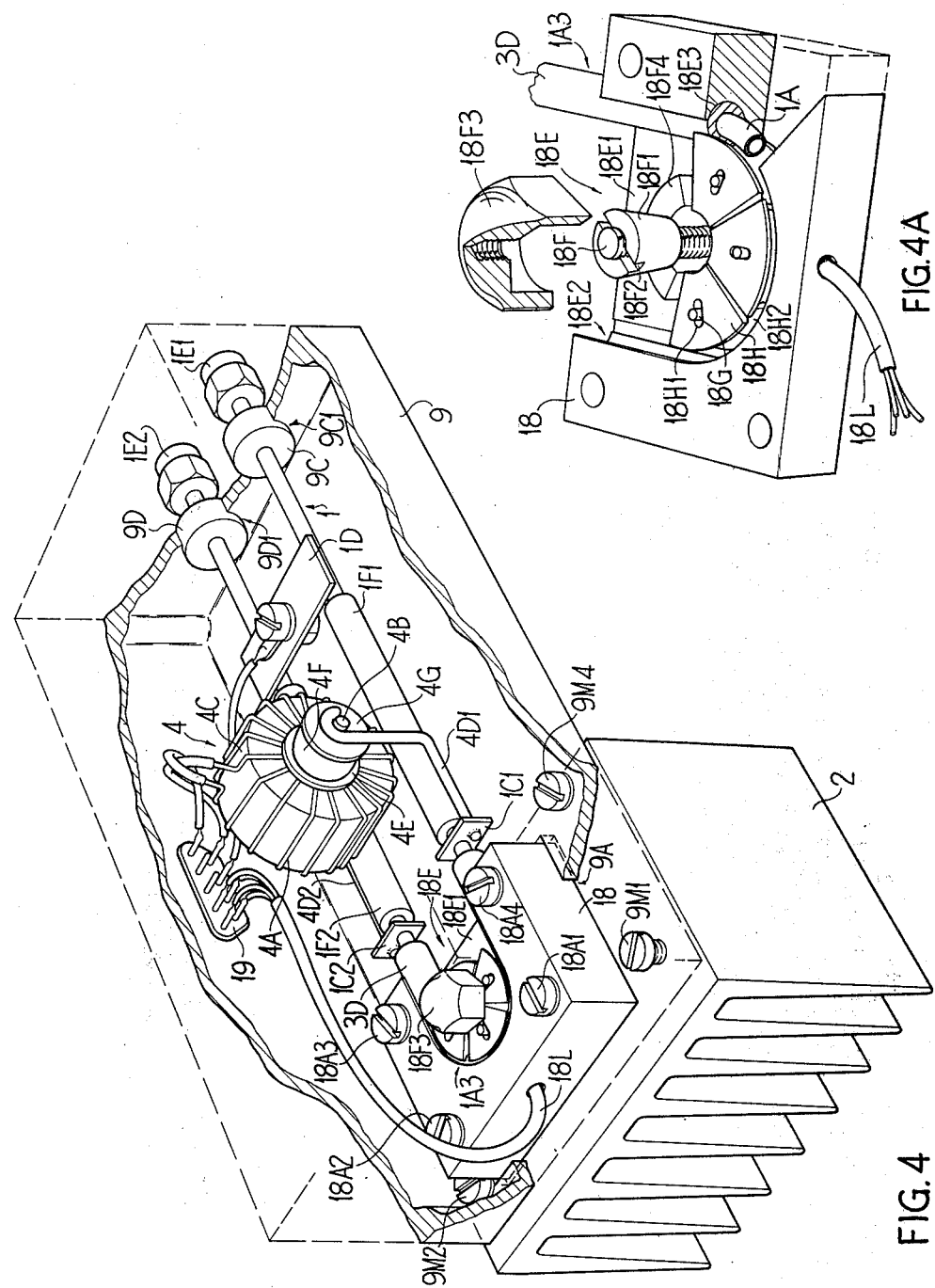
FIG. 4 is a modification of FIG. 3 in which a continuously adjustable thermal coupling is provided.

Reffering now to FIG. 4 and/or FIG. 4A, as appropriate, illustrating a further practical embodiment, a tube and transformer assembly is shown that is identical with the assembly shown in FIG. 3, except that the bend 1A (including therefore segments 1A1 and 1A2) is now provided with a foam silicone rubber sleeve 3D (the counterpart of pads 3A to 3C in FIG. 3) and the rectilinear limb portions 1B3 and 1B4 with similar sleeves 1F1 and 1F2 (the counterpart of foam silicone rubber slabs 11G and 11F). For convenience in description the sleeved bend 1A has been given the general reference 1A3.

The three sleeves referred to are lengths of foam silicone rubber tubing that have been slit longitudinally so that they can be opened out and wrapped round tube 1 after the brazing operation indicated with reference to FIG. 3 has been performed. To provide a close fit of the slit sleeves on tube 1, PTFE tape may be wrapped round them.

The block 2 is similar to block 2 in FIG. 3, except that the terminals for the thermo-electric pump have been omitted, of course, and other minor modifications to the top surface have been made. A thick aluminium slab 18 of generally square configuration is fastened to the top of block 2 by screws 18A1 to 18A4. Slab 18 passes through a window 9A in box 9, similarly to the FIG. 3 arrangement, and the box 9 is also fastened to block 2, by screws 9M1 to 9M4 (9M3 not shown).

A recess 18E having a flat floor 18E1 surrounded by an upright boundary wall 18E2 has been generated in slab 18 by a milling out operation along its medium plane. The recess 18E is intended to accommodate the sleeved bend 1A3 and in order to maintain an efficient thermal contact between the sleeve 3D and the slab 18, the boundary wall 18E2 is configured so as generally to match an outer co-operating portion of the sleeve 3D. As detailed in the cut-away of FIG. 4A, the wall 18E2 includes a groove 18E3 of semi-circular cross-section. In order not to obscure other details, only a small portion of the sleeved bend 1A3 is shown in FIG. 4A.

The sleeved bend 1A3 is brought into light engagement with the slab 18 by offering it to the open end of the recess 18E and sliding it endwise into the groove 18E3 while maintaining the median plane of the tube 1 approximately parallel to the floor 18E1. A tapped hole (not shown) provided in the floor 18E1, with its longitudinal axis passing through the nominal centre of curvature of the sleeved bend 1A3, enables a threaded stud 18F to be screwed into the slab 18 after the sleeved bend 1A3 has been eased into position in the recess 18E. In addition, three plain holes (not shown) are provided in the floor 18E1 so that three guide pins such as 18G may be forced into the holes following the fitting of stud 18F.

Three sectors such as 18H may now be fitted in the recess 18E, each sector being provided with a slot such as 18H1 for engaging a pin such as 18G. The three sectors may be imagined as having been obtained from a flat-sided pulley the rim of which is provided with a groove such as 18H2 of semi-circular cross section matching an inner co-operating contour portion of sleeve 3D. They are intended to transmit an adjustable compressive force to the sleeve 3D in a manner that will now be described.

Stud 18F carries a conical nut 18F1 with a slot 18F2 for engaging a hollow cylindrical tool (not shown) having a pair of diametrically opposed end projections. The nut 18F1 is shown in an inoperative position. When it is screwed down, it makes line contact with the inner arcuate contour of the sectors and forces them radially outward against the inner contour of sleeve 3D, which is compressed as a result. Adjustment of the nut 18F1 will continuously change the thermal resistance between the bend 1A and the block 2, within a given range. Once the adjustment has been made, it may be secured by screwing the domed nut 18F3 until its rim bears against the upper faces of the three sectors such as 18H. A spacer 18F4 only slightly thinner than the sectors is provided as an abutment for that portion of the nut 18F3 that does not contact the sectors, thus avoiding the generation of a component of force tending to tilt the stud 18F rearward. The arrangement for compressing the sleeve 3D represents continuously adjustable setting means is contrast to the pre-set setting means represented by the bobbin 10 in FIG. 3.

By substituting the assembly comprising in the main tube 1, transformer 4 and bobbin 10 in FIG. 3 with the equivalent assembly comprising tube 1, transformer 4 and slab 18 in FIG. 4, a further embodiment is realized which compared with the FIG. 3 embodiment offers the advantage of enabling the thermal resistance between tube 1 and block 2 to be continuously adjusted in seeking an optimum setting suiting particular operational requirements. The slab 18 would be positioned against the upper face of stage 7C and its four fixing screws would be threaded into corresponding tapped holes that would be provided in spreader plate part 8B.

Figure 5:
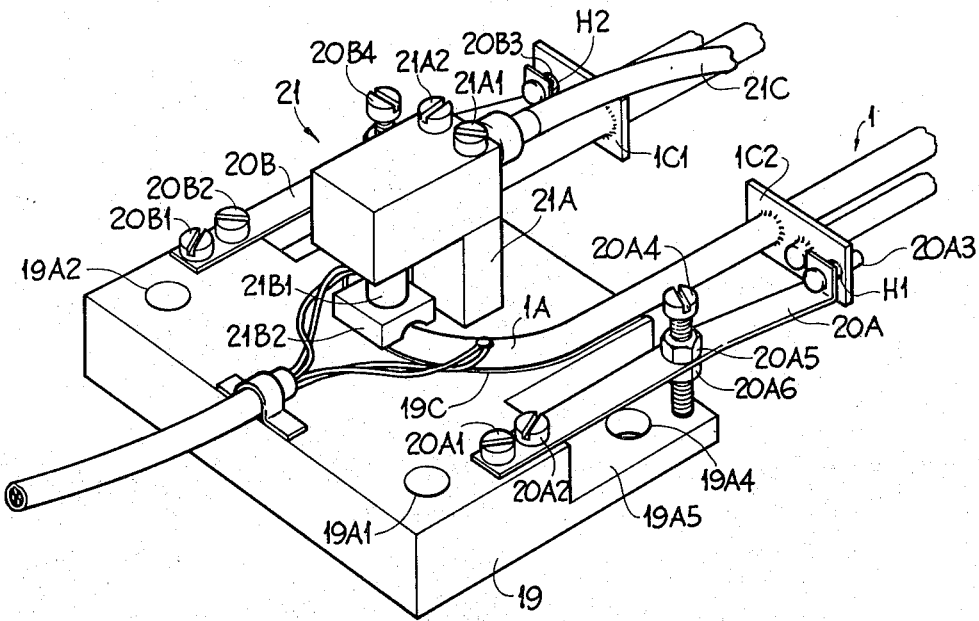
FIG. 5 depicts a scheme, applicable to embodiments with either assisted or non-assisted heat sinks, for selectively thermally coupling and decoupling the temperature depressing means and the hollow body.

In FIG. 5 an arrangement is shown that enables the thermal coupling between the U-tube and the heat sinking block to be made and broken at will through selectively operable actuator means. The tube 1, identical with tube 1 in FIG. 3 except for the holes H1 and H2 provided in tabs 1C1 and 1C2, respectively, is only partly shown and the transformer 4 has been omitted altogether. This has been done so as not to encumber the representation with details that have already been amply illustrated.

The arrangement may be used in conjunction with a heat sink, such as block 2 in FIG. 4, or a heat sink assisted by a thermo-electric pump, as in FIG. 3. It comprises an aluminium slab 19 which may be fitted to a heat sinking block in the same way as slab 18 is fitted to block 2 in FIG. 4 or, alternatively, to a block with interposed thermo-electric pump as described in connection with the FIG. 4 embodiment. To this end, the outer geometry of slab 19 is effectively identical with that of slab 18. Slab 19 is provided with four holes corresponding to the like holes in slab 18 (FIG. 4) for receiving fixing screws (not shown).

A stout leaf spring 20A is fixed at one end to slab 19 by two fixing screws 20A1 and 20A2 and is provided at the other end with a pin 20A3 anchored to a bent up tab of spring 20A. The pin 20A3 engages the hole H1 in a tab 1C1 and the set of the spring 20A is such that a downward force is transmitted through the pin 20A3 to the tube which is large compared with the antagonistic force due to the cantilever mounted U-tube 1.

In the absence of any restraint, the underside of bend 1A would be urged into contact with a shallow groove 19C cut into slab 19. In fact, spring 20A is restrained by a stop screw 20A4 which reacts against a step 19A5, milled out in slab 19, to adjust the lower travel limit of the spring 20A with the aid of adjusting nuts 20A5 and 20A6. Screw 20A4 thus permits to regulate the spacing between bend 1A and the groove 19C. When no action is taken to eliminate the spacing (which would normally be held to 1 mm or so), the tube 1 is effectively thermally insulated from the slab 19 and, consequently, from the block 2 that must be imagined as cooperating with it. This is the attitude of tube 1 relative to slab 19 that is selected during the desorption stage of the concentration process.

Before the condensation stage is initiated, the bend 1A is brought into contact with the groove 19C by a pneumatic actuator 21 fixed to the slab 19 through a spacer 21A by means of screws 21A1 and 21A2. The actuator 21 has a piston 21B1 provided with a pad 21B2 of low thermal conductivity which when compressed air is supplied through line 21C forces the bend 1A downward into contact with the groove 19C against the combined resiliency of the cantilever mounted U-tube 1 and the restrained spring 20A. When contact is established, the tube 1 is ready to be brought down to the depressed temperature required for the condensation stage.

A return spring (not shown) within the actuator 21 causes the piston 21B1 to lift up when the compressed-air supply is interrupted. At that point the bend 1A is urged upward by the recovery of that portion of spring 20A which extends in the main between the fulcrum provided by the stop screw 20A4 and the pin 20A3.

A further spring 20B symmetrical with spring 20A is provided. The parts associated with it which are visible in FIG. 5 are fixing screws 20B1 and 20B2, stop screw 20B4 and pin 20B3.

Practical data relating to the embodiments described with reference to FIGS. 3 and 3A, 4 and 4A, and FIG. 5 are listed below:

| U-tube | |
|---|---|
| Material | 316 Stainless Steel |
| Wall Thickness | 0.25 mm |
| Outer Diameter | 3.0 mm |
| Total length (from connector to connector) | 24 cm |
| Length of bend from tab to tab | 6 cm |
| Separation between limbs | 2 cm |
| Weight of bare tube | 4 grammes |
| Length of limb segments between tabs and shunt | 6 cm |
| Tabs length | 1 cm |
| Tabs width | 6 mm |
| Tabs thickness | 0.9 mm |
| Distance between tube axis and L-conductor axis | 0.5 cm |
| Foam Silicone Rubber Pads (FIG. 3 only) | |
| Thickness | 3 mm |
| Density | 30% silicone rubber 70% air |
| Foam Silicone Rubber Tube (FIGS. 4 and 4A only) | |
| Wall thickness | 3 mm |
| Outer diameter | 9 mm |
| Density | 30% silicone rubber 70% air |
| Transformer | |
| Inner diameter of core | 6.2 mm |
| Outer diameter of core | 19.5 mm |
| Height of core | 9.2 mm |
| Core material | Manganese-Zinc Ferrite |
| Initial permeability | 3000 |
| Inductance factor | 5860 nH/turn |
| Core manufacturer | Salford Electrical Industries, Heywood, Lancashire, England. |
| Weight of core | 10 grammes |
| Manufacturer's type No. | 629/10/T1 |
| Primary turns | 20 |
| Diameter and material of primary wire | 0.8 mm enamelled copper |
| Secondary turns | 1 |
| Diameter and material of secondary wire | 1.6 mm silver |

| | |
|---|---|
| Diameter and material of L-conductor | 1.6 mm silver |
| Length of L-conductor | 3.8 cm |
| Design frequency | 20 kHz |
| Thermo-electric Pump | |
| Make of Peltier units | Cambion Thermoionic Corporation, 445 Concord Avenue, Cambridge, Massachusetts, U.S.A. |
| Layout of first stage (nearest heat sink). | 4 units in series, each comprising 31 thermo-electric couples. Manufacturer's Part No: 801-2001-01 |
| Layout of second and third stages. | A combined unit in which the second stage comprises 31 thermo-couples and the third stage 21 thermo-couples. Manufacturer's Part No: 801-1003-01. |
| Pumping Capacity: | |
| (a) First stage (nearest to sink) | 20 watts of heat in, 80 watts of heat out. |
| (b) Second stage | 10 watts of heat in, 20 watts of heat out. |
| (c) Third stage | 2 watts of heat in, 10 watts of heat out. |
| DC voltage and current | 13 volts, 6A |
| Residual ripple in DC supply | About 0.1 volt, peak-to-peak |
| Heat Sink | |
| Area of hot face | 220 cm² (10 × 22 cm projected area) |
| Length of fins from hot face to fin tip | 8.2 cm |
| Material | Aluminium |
| AC Supply to Transformer | |
| Frequency | 20 kHz |
| Supply design | 20 kHz oscillator followed by power amplifier |
| Output power of amplifier | 150 watts (short term ratings) |

The following data relate to a specific method of concentration in time that may be performed on apparatus as described with reference to FIGS. 3 and 3A; 4 and 4A; and FIG. 5. The output of the apparatus is assumed to be fed to a Gas Chromatograph.

| | |
|---|---|
| Flow rate of mixture through the U-tube | 20 ml/min |
| Nature of Flow | Continuous and constant during condensation and desorption times |
| Gas carrier | Nitrogen |
| Gas component | Organic materials at 0.1 to 100 parts per million levels |
| Condensation time | 3-30 minutes, typically 5 minutes |
| Condensation temperature | −30° C. |
| Desorption time | 15 seconds |
| Desorption temperature | 200° C. to 300° C. |

It can now be better appreciated, upon consideration of the embodiments hereinbefore described, that the use of a transformer operating at a frequency that is high compared with the normal frequency of the AC public supply in combination with solid phase temperature depressing means offers great latitude of design in realizing the invention. Although a frequency of 20 kHz was chosen for the embodiments referred to, tests were carried out to establish whether some of the advantages of the invention could still be retained by operating at a frequency as low as 1 kHz. It was found that all the advantages were realized at least to an extent that still represented an advancement over the prior art. Although the volume of core material required goes up as the frequency is decreased, at 1 kHz it was still very small compared with that required at the frequency of the public supply. The main disadvantage of operating at frequencies below 1 kHz is the greater thermal loading of the hollow body by the more extensive secondary winding that must be used, which in turn means that greater pumping power is required from the thermo-electric pump. However, if the depressed temperature required is near ambient rather than some 30 degrees C. below ambient, the pumping power can still be quite moderate. Where the operational requirements—in terms of the elevated temperature that must be reached in a given time for thermal desorption and the time permissible for cooling the hollow body prior to condensing the gas component—vary between wide limits, the transformer is best designed for the highest operating frequency permitted by practical considerations. The choice of 20 kHz in the realization of the foregoing embodiments is dictated mainly by the economics of presently available transistors. Operational advantages would be obtained by adopting a frequency in excess of 50 kHz but at higher cost.

Although a hollow body in the form of a U-tube has been incorporated in the foregoing embodiments, other geometries are equally suitable but with a different balance of advantages. The U-shape is particularly conveniently constructionally. It makes for a very short transformer secondary and the transformer itself can be neatly accommodated between the limbs of the U. At the same time it provides a convenient way of arranging for the limbs to be heated in parallel with the bend portion in order to minimize re-condensation problems.

The thickness of the hollow tube regardless of its form should be within the range of 0.05 to 0.5 mm but preferably between 0.1 and 0.375 mm.

While the invention has been described with particular reference to specific embodiments thereof, it must be understood that its scope is to be limited solely by the claims appended hereto.

What is claimed is:

1. A method of increasing the concentration in time of a gas component entrained in a carrier gas with which it forms a mixture, comprising the steps of:
    (a) interposing between a solid phase temperature depressing means and an electrically conductive hollow body of low thermal capacity a thermal coupling means comprising a material having a thermal conductivity much lower than that of the hollow body and prearranging the thermal resistance actually offered by the material to hold the hollow body at a given depressed temperature while the mixture is streamed through the hollow body;
    (b) maintaining the stream for a predetermined condensation time to condense the gas component within the hollow body;
    (c) raising the hollow body to an elevated temperature by applying ohmic heating thereto through a step-down transformer operating at a frequency of at least one kilohertz; and
    (d) maintaining the elevated temperature for a predetermined thermal desorption time that is short compared with said condensation time to desorb the condensed gas component.

2. A method as claimed in claim 1, including the step of keeping the temperature depressing means operative during both the condensation time and the desorption time.

3. A method as claimed in claim 2, including the step of prearranging said material to offer a thermal resistance value of between 5 and 50 degrees C. per watt.

4. A method as claimed in claim 3, including the step of interposing between the hollow body and the temperature depressing means a yielding material the thermal resistance of which changes when subjected to a deformation force and adjusting the thermal resistance value by applying a suitable force onto the said yielding material.

5. A method as claimed in claim 4, including the step of interposing a foam silicone rubber material and applying a compressive force thereon.

6. A method as claimed in claim 1, wherein the temperature depressing means is kept operative during both the condensation time and the desorption time and a close thermal coupling between the electrically conductive hollow body and the temperature depressing means is maintained during the condensation time but is broken by the interposition of a small air gap during the desorption time.

7. A method as claimed in claim 2 or in claim 6, including the step of incorporating a multi-stage thermoelectric pump as part of said temperature depressing means.

8. A method as claimed in claim 1, including the step of prearranging the step-down transformer to load the hollow body with an effective thermal capacity that is not greater than 5 times the thermal capacity of the hollow body.

9. A method as claimed in claim 1, including the step of substantially thermally insulating the secondary of the step-down transformer from the rest of the transformer largely by using air for the purpose.

10. A method as claimed in claim 1, including the step of operating the step-down transformer at a frequency of at least 10 kHz.

11. A method as claimed in claim 1, including the step of applying ohmic heating to the hollow body in the form of a longitudinally extending tube and arranging for a median working segment thereof to be heated to a higher temperature compared with two flanking segments acting as thermal buffers to the median working segment between them.

12. Apparatus for increasing the concentration in time of a gas component entrained in a carrier gas with which it forms a mixture, comprising:
(a) an electrically conductive hollow body of low thermal capacity having input port and output port for establishing a gas stream therebetween;
(b) solid phase temperature depressing means operable to maintain the hollow body at a given depressed temperature;
(c) a selectively operable step-down transformer having a secondary winding electrically coupled to the hollow body to raise the hollow body to an elevated temperature by ohmic heating, said step-down transformer being adapted to operate at a frequency of at least one kilohertz; and
(d) a static solid phase thermal coupling means of predetermined thermal resistance between the hollow body and the temperature depressing means, said coupling means comprising a solid state thermal coupling material having an effective thermal conductivity much lower than that of the hollow body.

13. Apparatus as claimed in claim 12, including setting means operable on the thermal coupling means for setting the resistance value of the thermal coupling means.

14. Apparatus as claimed in claim 13, wherein the setting means is operable to apply a deforming force on the thermal coupling means and the thermal coupling means is a material the thermal resistance of which changes as the force is changed within limits.

15. Apparatus as claimed in claim 14, wherein the material is foam silicone rubber.

16. Apparatus as claimed in claim 12, wherein said thermal resistance value is between 5 and 50 degrees C. per watt.

17. Apparatus for increasing the concentration in time of a gas component entrained in a carrier gas with which it forms a mixture, comprising:
(a) an electrically conductive hollow body of low thermal capacity having input port and output port for establishing a gas stream therebetween;
(b) solid phase temperature depressing means operable to maintain the hollow body at a given depressed temperature;
(c) a selectively operable step-down transformer having a secondary winding electrically coupled to the hollow body to raise the hollow body to an elevated temperature by ohmic heating, said step-down transformer being adapted to operate at a frequency of at least one kilohertz; and
(d) means for selectively establishing and breaking a close thermal coupling between the hollow body and the temperature depressing means.

18. Apparatus as claimed in claim 17, wherein the means for selectively establishing and breaking include an actuator which in one operative position brings the hollow body and the temperature depressing means into close thermal contact and in another causes the said contact to be broken and a small air gap interposed.

19. Apparatus as claimed in claim 12, or in claim 17, wherein the solid phase temperature depressing means include a multi-stage thermoelectric pump.

20. Apparatus for increasing the concentration in time of a gas component entrained in a carrier gas with which it forms a mixture, comprising:
(a) an electrically conductive hollow body of low thermal capacity having input port and output port for establishing a gas stream therebetween;
(b) solid phase temperature depressing means operable to maintain the hollow body at a given depressed temperature; and
(c) a selectively operable step-down transformer having a secondary winding electrically coupled to the hollow body to raise the hollow body to an elevated temperature by ohmic heating, said step-down transformer being adapted to operate at a frequency of at least one kilohertz and to load the hollow body with an effective thermal capacity that is not greater than 5 times the thermal capacity of the hollow body.

21. Apparatus as claimed in claim 12, wherein the solid phase temperature depressing means include a multi-stage thermo-electric pump.

22. Apparatus as claimed in claim 12, wherein the step-down transformer includes a secondary winding that is substantially thermally insulated from the remainder of the transformer, the thermal insulation being largely provided by air.

23. Apparatus as claimed in claim 22, wherein the step-down transformer includes a toroidal core and the secondary winding is a single conductor passing through the core.

24. Apparatus as claimed in claim 20, wherein the step-down transformer includes a magnetic core the weight of which relative to the weight of the hollow body is in a ratio not exceeding 50:1.

25. Apparatus as claimed in claim 12, wherein the secondary of the step-down transformer is electrically coupled to the hollow body through a pair of connecting elements having an electrical resistance considerably higher than that of the secondary so as to supply local heat at the points of connection.

26. Apparatus as claimed in claim 20, wherein the step-down transformer is adapted to operate at a frequency of at least 10 kHz.

27. Apparatus as claimed in claim 20, wherein the hollow body is a tube having a wall thickness ranging from 0.05 to 0.5 mm.

28. Apparatus as claimed in claim 27, wherein said wall thickness is between 0.1 and 0.375 mm.

29. Apparatus for increasing the concentration in time of a gas component entrained in a carrier gas with which it forms a mixture, comprising:

(a) an electrically conductive hollow body of low thermal capacity having input port and output port for establishing a gas stream therebetween;

(b) solid phase temperature depressing means operable to maintain the hollow body at a given depressed temperature;

(c) a selectively operable step-down transformer having a secondary winding electrically coupled to the hollow body to raise the hollow body to an elevated temperature by ohmic heating, said step-down transformer being adapted to operate at a frequency of at least one kilohertz; and (d) a median working segment in said hollow body delimited by the connections of the transformer secondary with the hollow body, said median working segment being flanked on each side by a buffer segment, the buffer segment forming part of an electrical circuit the electrical impedance of which is greater than that of the median segment.

* * * * *